(12) United States Patent
Kallay et al.

(10) Patent No.: US 6,760,037 B2
(45) Date of Patent: Jul. 6, 2004

(54) SYSTEMS AND METHODS FOR PROVIDING IMPROVED TWO PASS RESAMPLING

(75) Inventors: Michael Kallay, Bellevue, WA (US); Jason Davis Lawrence, Princeton, NJ (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 10/098,228

(22) Filed: Mar. 15, 2002

(65) Prior Publication Data

US 2003/0174129 A1 Sep. 18, 2003

(51) Int. Cl.$^7$ .................................................. G09G 5/00
(52) U.S. Cl. ........................ 345/619; 345/427; 382/276; 382/277
(58) Field of Search ................................ 345/619, 427; 382/276, 277

(56) References Cited

U.S. PATENT DOCUMENTS

| | | | | |
|---|---|---|---|---|
| 5,175,808 A | * | 12/1992 | Sayre | 345/647 |
| 5,204,944 A | * | 4/1993 | Wolberg et al. | 345/427 |
| 5,638,068 A | * | 6/1997 | Nickerson | 341/67 |
| 5,808,623 A | * | 9/1998 | Hamburg | 345/619 |
| 6,670,965 B1 | * | 12/2003 | McKeown | 345/660 |

OTHER PUBLICATIONS

Chen, J.L. et al., "2–D Discrete Signal Interpolation and its Image Resampling Application Using Fuzzy Rule–Based Interference," *Fuzzy Sets and Systems*, 2000, 114(2), 225–238.

Darwish, A.M. et al., "Adaptive Resampling Algorithm for Image Zooming," *IEEE Proc.—Vision, Image and Signal Proc.*, 1997, 144(4), 207–212.

Dodgson, N.A., "Qaudratic Interpolation for Image Resampling", *IEEE Trans. on Image Proc.*, 1997, 6 (9), 1322–1326.

Floyd, C. E. et al., "Image Resampling on a Cylindrical Sector Grid," *IEEE Trans. on Med. Imaging.*, 1986, MI–5(3), 128–131.

Oakley, J.P. et al., "Reducing Aliasing Artifacts in Images by Matched Resampling," *IEEE Colloquium on 'Noise in Images'*, 1987, Digest No. 17, 5/1–4.

Owen, C.B. et al., "Bottleneck–Free Separable Affine Image Warping," *Proceedings Int'l Conference on Image Processing*, Santa Barbara, California, Oct. 26–29, 1997, 1, 683–686.

Pluim, J.P.W. et al., "Interpolation Artefacts in Mutual Information–Based Image Registration," *Comp. Vision and Image Understanding*, 2000, 77 (2), 211–232.

Zavacky, J. et al., "Resampling of an Image by Block–Based Interpolation or Decimation with Compensation," *Radioengineering*, 2000, 9 (2), 18–24.

(List continued on next page.)

Primary Examiner—Matthew C. Bella
Assistant Examiner—Po-Wei Chen
(74) Attorney, Agent, or Firm—Woodcock Washburn LLP

(57) ABSTRACT

Systems and methods are provided for improved two pass resampling in a computing system. The systems and methods address both bottleneck problem(s) and aliasing problem(s) to improve upon prior art two pass resampling techniques. In view of both bottleneck problem(s) and aliasing problem(s), for each of four possibilities associated with two pass resampling, the four possibilities being (1) pre-rotating the 2-D data and performing row-first processing (2) pre-rotating the 2-D data and performing column-first processing, (3) not pre-rotating the 2-D data and performing row-first processing and (4) not pre-rotating the 2-D data and performing column-first processing, the bottleneck error and the aliasing error associated with the possibility are calculated. Also, for each possibility, a value is computed based upon the bottleneck error and the aliasing error. The choice of the four possibilities is then selected in accordance with a comparison of the values.

44 Claims, 9 Drawing Sheets (4 of 9 Drawing Sheet(s) Filed in Color)

OTHER PUBLICATIONS

Wolberg, G. et al., "One–Dimensional Resampling with Inverse and Forward Mapping Functions," *Journal of Graphics Tools*, 2000, 5 (3), 11–33 printed from http://www.acm.org/jgt/papers/WolbergEtA100/ on Jan. 16, 2002.

Catmull, Ed et al., "3–D Transformation of Images in Scanline Order," *SIGGRAPH '80 Conference Proceedings*, Jul. 14–18, 1980, 1–18.

* cited by examiner

SYSTEMS AND METHODS FOR PROVIDING IMPROVED TWO PASS RESAMPLING

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright© 2001, Microsoft Corp.

FIELD OF THE INVENTION

The present invention relates to systems and methods for providing improved two pass resampling in a computing system. More particularly, the present invention relates to systems and methods for optimizing the quality of a resultant transformation in connection with two pass resampling algorithm(s) in a computing system.

BACKGROUND OF THE INVENTION

The two pass resampling algorithm provides an efficient way to process an arbitrary transformation on a raster image. The efficiency is gained by decomposing the transformation into two passes. The first pass maps every row of the image to a row of an intermediate image, and the second pass maps every column of the intermediate image to a column of the final result. The mapping of a row or a column is performed as a one-dimensional scan. Today's processors operate extremely fast with respect to one-dimensional arrays of data, and thus the two pass resampling algorithm is very efficient.

The decomposition into two passes is an approximation of the original two-dimensional mapping, and like any approximation, some error may result depending upon the signal being mapped and/or the original mapping being applied to the signal. Unfortunately, under certain combinations of circumstances, the resulting error may seriously degrade the quality of the result. The quality can be significantly improved by either pre-rotating the image by 90°, or by changing the order to scan columns-first. Permuting these two choices provides four variations, namely: (1) pre-rotating the data and processing row-first (2) pre-rotating the data and processing column-first, (3) no pre-rotation of the data and processing row-first and (4) no pre-rotation of the data and processing column-first. For any given mapping, one of the four variations will provide the best result. One prior art algorithm that attempts to choose the best of the four variations chooses the variation that produces the largest intermediate image area. While choosing the course that results in largest intermediate image area is a reasonable approach, unfortunately, such a choice does not always lead to the best choice. In this regard, the association of a large intermediate area with a good final result is heuristic, having no theoretical basis. The area of the intermediate image reflects the behavior of the algorithm on average, but good average behavior may conceal locally poor behavior or other aberration(s), as illustrated by FIGS. 1A and 1B.

FIG. 1A illustrates a first problem with the method that selects one of the four variations based upon a maximization of the intermediate image area. In this example, the transformation is projective. As a result of the prior art method, the intermediate image of greatest area contains a singularity. FIG. 1A thus illustrates a first source of trouble in the two pass resampling algorithm, i.e., the "bottleneck" problem, wherein the data represented by the singularity cannot be reconstructed adequately due to the lack of information available at that point of the intermediate image.

The bottleneck problem is particularly acute when the mapping is a 90° rotation. In such a case, sampling rows-first transforms a horizontal line to a vertical one, such that the first pass shrinks the entire image to a single vertical line, from which the end result cannot be recovered. Similarly, a first vertical scan shrinks the entire image to a single horizontal line. The problem disappears if the image is pre-rotated by 90°. The example wherein the mapping is a 90° rotation is an extreme case where the end result is disastrous. Where the intermediate image has just one collapsed row, as in FIG. 1A, the result shows up as a tear in the final image. Thus, the method that selects the intermediate image with maximum area ignores the possibility of a portion of the intermediate image with a very small area.

Thus, a solution could be constructed which minimizes the bottleneck problem; however, minimizing the bottleneck would not in all cases solve the problems associated with a second source of trouble in the two pass algorithm, i.e., the aliasing problem. The aliasing problem is illustrated in FIG. 1B, which shows unwarranted aliasing of vertical edges in the resulting image.

The transformation employed in FIG. 1B stretches the lower portion of the image vertically, while shrinking the upper portion. While the bottleneck problem has been addressed, aliasing error has not been addressed. As a result, the fine pixels of any diagonal feature-line at the bottom are magnified by the transformation to visible steps, aliasing the line. The flaw is inherent in the transformation, but vertical lines are immune to it. Unfortunately, the first pass (rows-first) in FIG. 1B transforms vertical lines in the source to highly slanted diagonal lines in the intermediate image, and the vertical stretching in the second pass aliases them. This defect is highly visible on the image's vertical edges. Such aliasing is not the fault of the transformation, but rather the aliasing is introduced by the transformation's two pass decomposition. Even though the choice of the four variations is such that the bottleneck problem has disappeared, the aliasing problem persists. Thus, in addition to adequately handling the bottleneck problem, it would be desirable to provide a method that also adequately addresses the aliasing problem.

Thus, in view of the deficiencies associated with prior art two pass resampling techniques, improved systems and methods for providing two pass resampling are desired. In this regard, it would be desirable to provide two pass resampling systems and methods that address both bottleneck error and aliasing error. More particularly, it would be desirable to provide two pass resampling systems and methods that minimize effects from both bottleneck and aliasing error.

SUMMARY OF THE INVENTION

In view of the foregoing, the present invention provides systems and methods that improve two pass resampling in a computing system. The systems and methods address both bottleneck problem(s) and aliasing problem(s) to improve upon prior art two pass resampling techniques. In view of both bottleneck problem(s) and aliasing problem(s), for each of four possibilities associated with two pass resampling, the four possibilities being (1) pre-rotating the 2-D data and performing row-first processing (2) pre-rotating the 2-D data and performing column-first processing, (3) not pre-rotating the 2-D data and performing row-first processing and (4) not pre-rotating the 2-D data and performing column-first processing, the bottleneck error and the aliasing error associated with the possibility are calculated. Also, for each possibility, a value is computed based upon the bottleneck error and the aliasing error. The choice of the four possibilities is then selected in accordance with a comparison of the values.

Other features and embodiments of the present invention are described below.

BRIEF DESCRIPTION OF THE DRAWINGS

The file of this patent includes at least one drawing executed in color. Copies of this patent with color drawings will be provided by the United States Patent and Trademark Office upon request and payment of the necessary fee.

The system and methods for providing improved two pass resampling are further described with reference to the accompanying drawings in which.

DETAILED DESCRIPTION OF THE INVENTION

Overview

As described in the background, there are four variations in applying two pass resampling: (1) pre-rotating the data and processing row-first (2) pre-rotating the data and processing column-first, (3) no pre-rotation of the data and processing row-first and (4) no pre-rotation of the data and processing column-first. The present invention teaches systems and methods which choose among the four variations to optimize the two pass resampling algorithm. More particularly, the present invention optimizes the choice of the four variations in view of theoretical calculations that take both bottleneck error and aliasing error into account.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may perform operations in connection with two pass resampling algorithm(s). The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may perform operations in connection with two pass resampling algorithm(s) in an improved manner in accordance with the present invention.

Figure 2A:
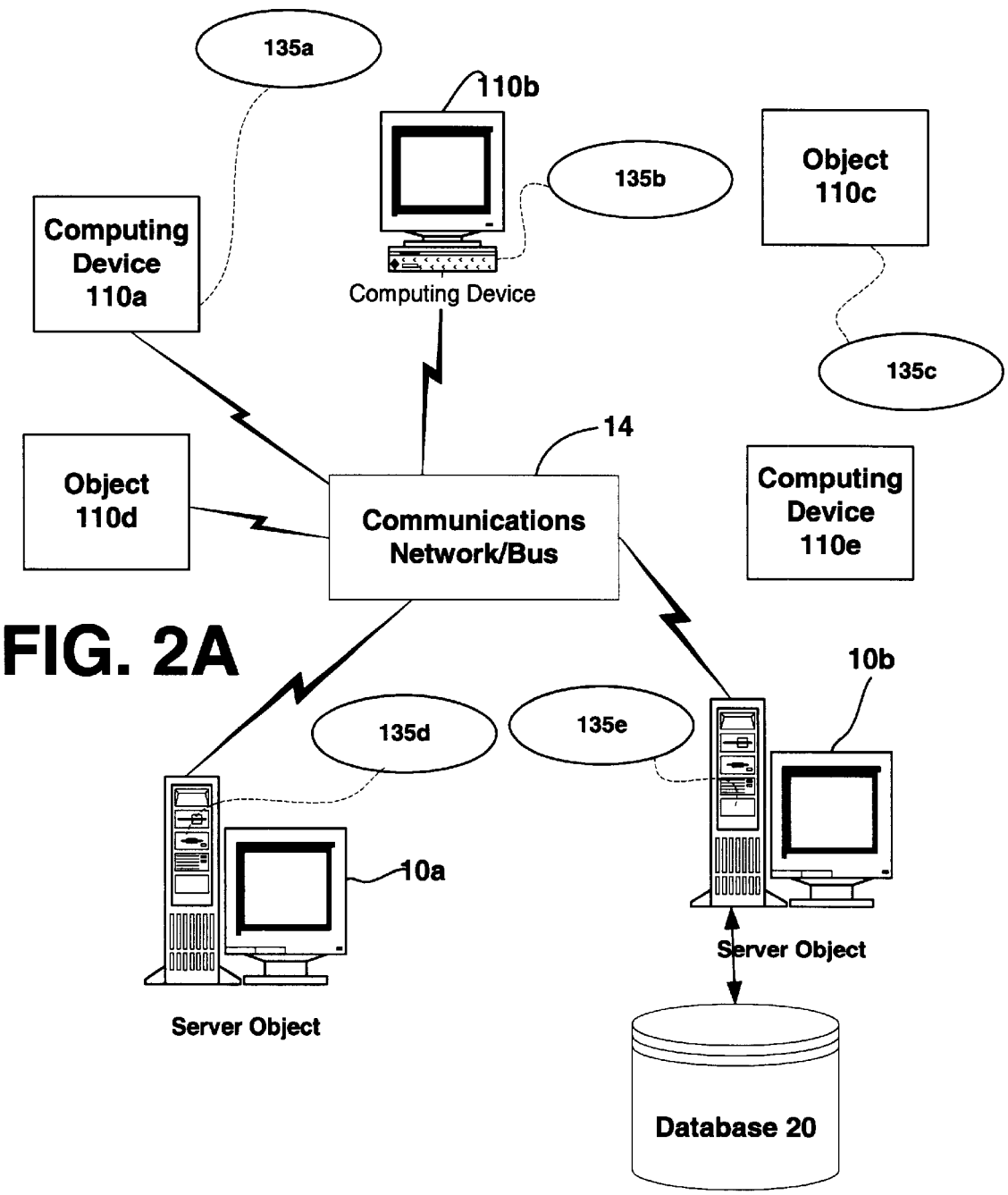
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2A. In accordance with an aspect of the invention, each object 10 or 110 may contain an application that might request two pass resampling algorithmic resources of a host system.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. The objects including the improved two pass resampling techniques in accordance with the present invention may thus be distributed among clients and servers, acting to perform two pass resampling in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since graphics objects processed according to two pass resampling may in practice be physically located in one or more locations, the ability to act at a networked distance is of great utility in such a system.

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed, processed or utilized incident to the improved two pass resampling of the invention.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to provide improved two pas resampling that minimizes bottleneck and aliasing error(s).

In a network environment in which the communications network/bus 14 is the Internet, At) for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing graphics data to be two pass resampled. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Exemplary Computing Device

Figure 2B:
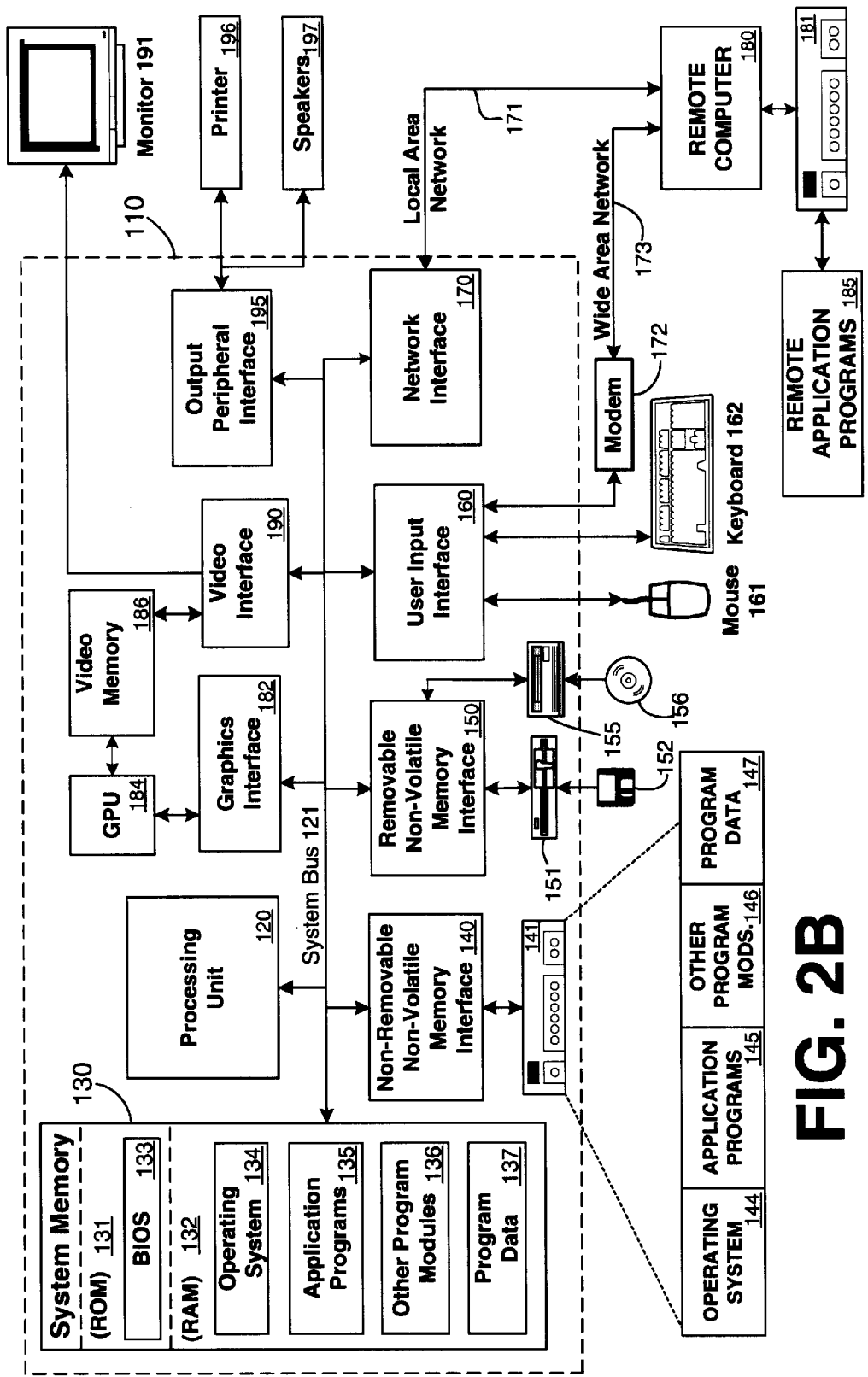
FIG. 2B is a block diagram representing an exemplary non-limiting computing device in which the present invention may be implemented.

FIG. 2B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the techniques of the invention.

Although not required, the invention can be implemented via an operating system, for use by a developer of services for a device or object, and/or included within application software that aids in performing two pass resampling. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.
Exemplary Distributed Computing Frameworks or Architectures Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .Net platform includes servers, building-block services, such as Web-based data storage and downloadable device software. Generally speaking, the .Net platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that improved two pass resampling services may be performed by, supported in or accessed via all of .NET's languages and services, and in other distributed computing frameworks as well.
Improved Two Pass Resampling Thus, as pointed out with respect to FIGS. 1A and 1B, the heuristic choice of maximizing the area of the intermediate image of the two pass resampling algorithm does not always lead to the best result because of the bottleneck problem(s) and/or aliasing problem(s). Moreover, even if the bottleneck error is minimized, such a choice may produce undesirable aliasing error. Thus, the invention provides a theoretically sound test for choosing the variation of the four variations, which is the least offensive with respect to bottleneck error and aliasing error. The test is general for the various embodiments described below, and for projective (perspective) transformations, the invention may be applied simply and inexpensively.

Figure 1A:
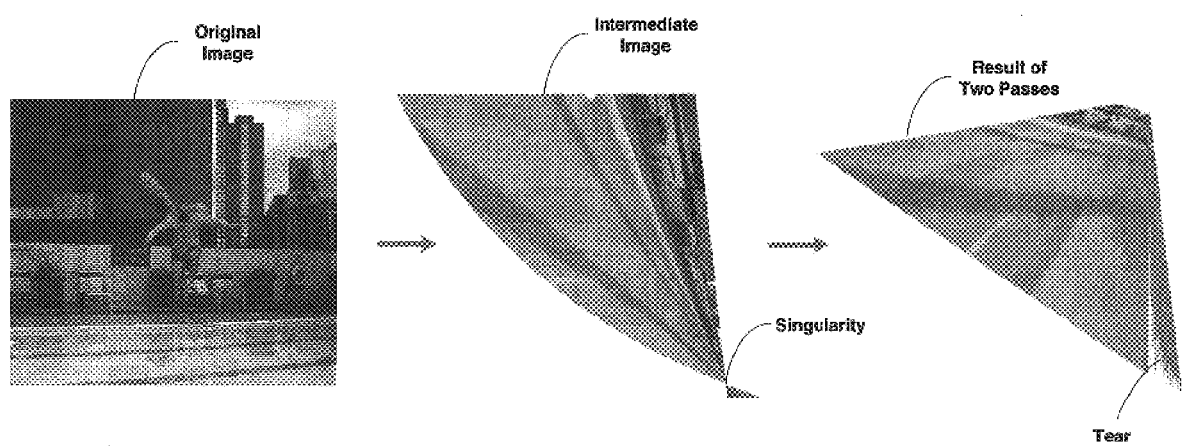
FIG. 1A illustrates a first source of error in connection with a two pass resampling process that is remedied by the invention.
Figure 3A:
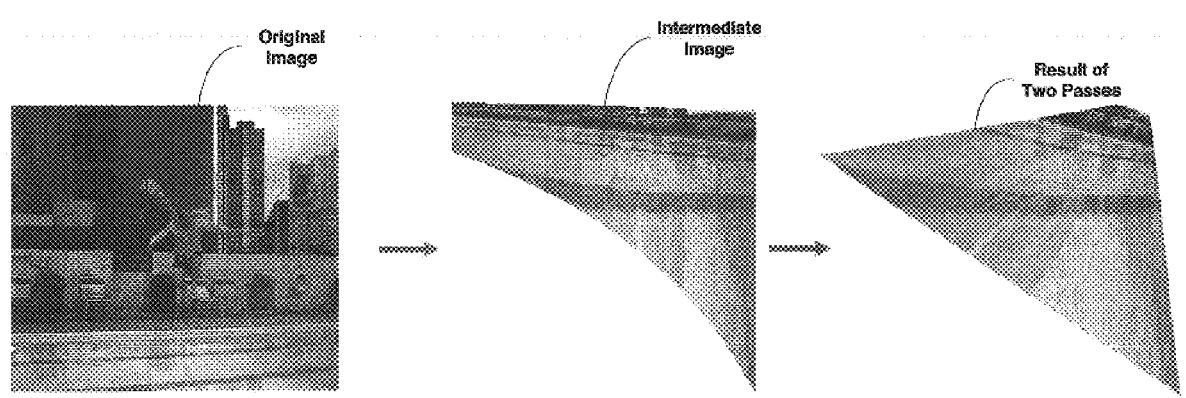
FIG. 3A illustrates elimination of the first source of error by the present invention.

Instead of applying the choice which maximizes the area of the intermediate image, FIG. 3A illustrates the result produced when the invention is applied to the situation of FIG. 1A. While the choice made in FIG. 3A for the same transformation of FIG. 1A has a smaller intermediate area, the choice of FIG. 3A produces a clean result, without the tearing effect due to the singularity. However, as mentioned, minimizing just the bottleneck error may lead to aliasing problems.

Figure 1B:
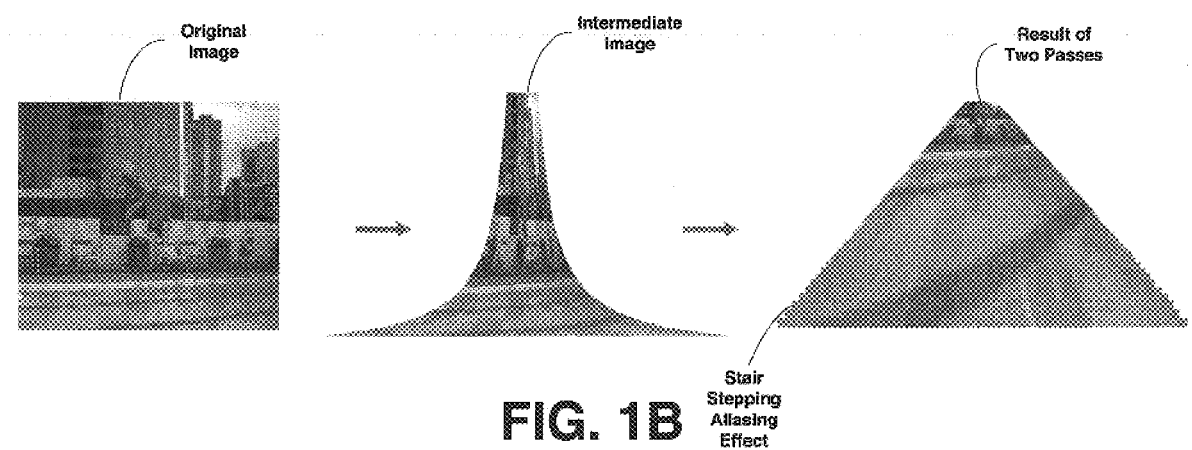
FIG. 1B illustrates a second source of error in connection with a two pass resampling process.
Figure 3B:
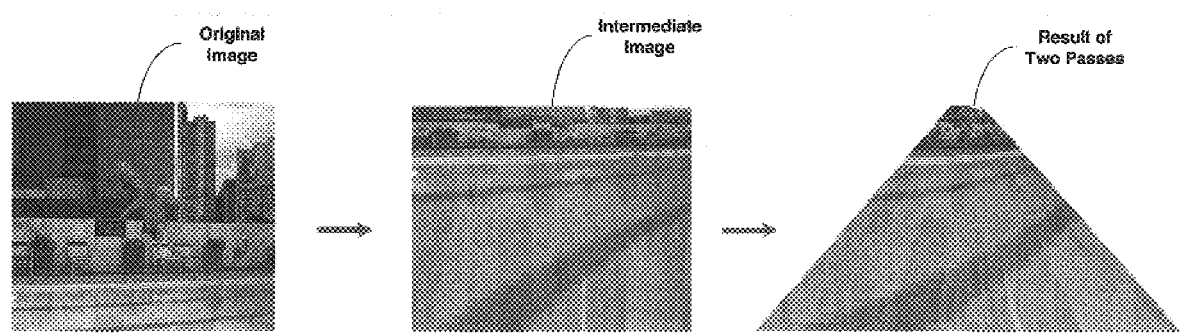
FIG. 3B illustrates elimination of the second source of error in addition to the first source of error by the present invention.

FIG. 1B illustrates that the choice that would be made by the bottleneck test alone is bad from the aliasing point of view. In this regard, FIG. 3B illustrates that scanning column-first instead avoids the aliasing problem because its first pass leaves vertical lines vertical. Thus, taking both the bottleneck error and the aliasing error into account provides the best solution in accordance with the invention.

With respect to the bottleneck problem, for example, even when a row does not shrink entirely, a very short row in the intermediate image represents a substantial loss of information, reducing the quality of the final result. Thus, there need not be a singularity to produce bottleneck error in the result.

To analyze the bottleneck problem, herein a mapping (x(u,v), y(u,v)) is considered from the unit square $0 \leq u, v \leq 1$, wherein rows are scanned first, and du is an infinitesimal horizontal line segment in the source image. The first pass maps it to a horizontal segment of length $$|dx| = \left|\frac{\partial x}{\partial u} du\right|$$

in the intermediate image, and the second pass takes it to a segment of length $\sqrt{(dx)^2 + (dy)^2}$. The loss of information in the first pass is the ratio $$\frac{\sqrt{(dx)^2 + (dy)^2}}{|dx|}.$$

The worst spot in the image will be at the maximum of this ratio, and so the variation should be chosen that minimizes this maximum. It is noted that the bottleneck test thus does not involve the intermediate image.

The maximum of this ratio coincides with the maximum of the slope $$\left|\frac{dy}{dx}\right| = \left|\frac{\partial y / \partial u}{\partial x / \partial u}\right|.$$

Thus, the row-first bottleneck error is $$\max\left\{\left|\frac{\partial y / \partial u}{\partial x / \partial u}\right| : 0 \leq u, v \leq 1\right\}.$$

Similarly, the columns-first error is $$\max\left\{\left|\frac{\partial x / \partial v}{\partial y / \partial v}\right| : 0 \leq u, v \leq 1\right\}.$$

With pre-rotation, the rows-first error is $$\max\left\{\left|\frac{\partial y / \partial v}{\partial x / \partial v}\right| : 0 \leq u, v \leq 1\right\},$$

and the column first error is $$\max\left\{\left|\frac{\partial x / \partial u}{\partial y / \partial u}\right| : 0 \leq u, v \leq 1\right\}.$$

To minimize the bottleneck error, the variation is chosen which results in the least error.

In FIG. 1A, scanning rows-first with pre-rotation was the choice with maximal intermediate area, but it led to a bottleneck singularity, which manifests itself as an infinite bottleneck error. The least bottleneck error choice indicates scanning columns-first without pre-rotation, which is clearly superior, as FIG. 3A shows.

Minimizing the bottleneck error alone, however, may lead to the aliasing problem, however, as illustrated by the stair stepping effect of FIG. 1B. In accordance with the present invention, when the aliasing problem is also taken into account, the choice made leads to the vertical edges staying vertical in the intermediate image, producing the best result.

While the least intermediate area test also addresses the aliasing problem in some sense, as mentioned in the background, the problem with the least intermediate area test as mentioned is that the test is only good on the average. Thus, the present invention theoretically performs better all around by eliminating the worst offender in view of both the bottleneck error and the aliasing error. Thus, in addition to supplying an effective metric for handling bottleneck error, the invention supplies an effective metric for the aliasing offense. For rows-first without pre-rotation, wherever the transformation stretches vertically—i.e. if $$\max\left|\frac{\partial y}{\partial v}\right| > 1$$

—it is desirable that vertical lines stay as vertical as possible in the intermediate image. With this in mind, differentially, an infinitesimally small vertical line segment dv in the source image is considered herein; the first pass will map it to an infinitesimal segment whose deviation from vertical is measured by $$\left|\frac{\partial x}{\partial v}\right|,$$

which is the inverse of the segment's slope in the intermediate image. Wherever $$\left|\frac{\partial y}{\partial v}\right| \leq 1$$

there is no vertical stretching, so aliasing can be avoided for such a position. A reasonable metric is thus the greatest product of stretching and slanting, that is, $$\max\left\{\left(\max\left\{\left|\frac{\partial y}{\partial v}\right| - 1, 0\right\}\right) \cdot \left|\frac{\partial x}{\partial v}\right|\right\}.$$

Similarly, for columns-first without pre-rotation, a reasonable metric is $$\max\left\{\left(\max\left\{\left|\frac{\partial x}{\partial u}\right| - 1, 0\right\}\right) \cdot \left|\frac{\partial y}{\partial u}\right|\right\}.$$

Figure 4A:
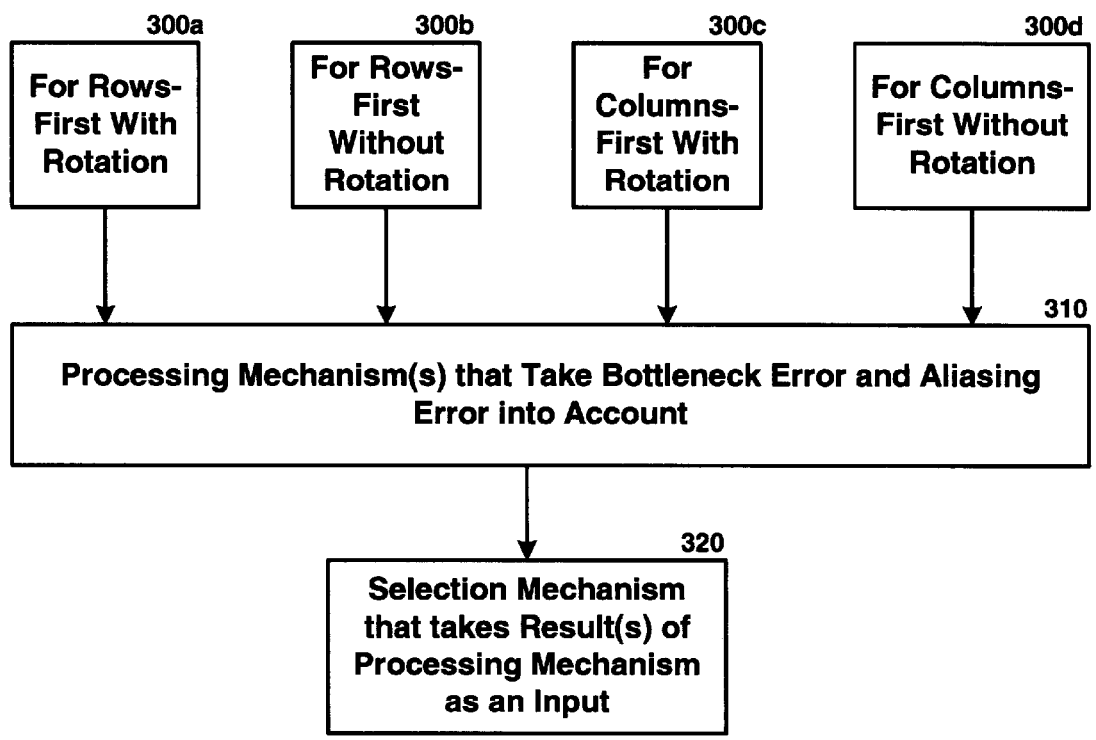
FIGS. 4A through 4C illustrate exemplary processes in accordance with the improved two pass resampling of the present invention.
Figure 4B:
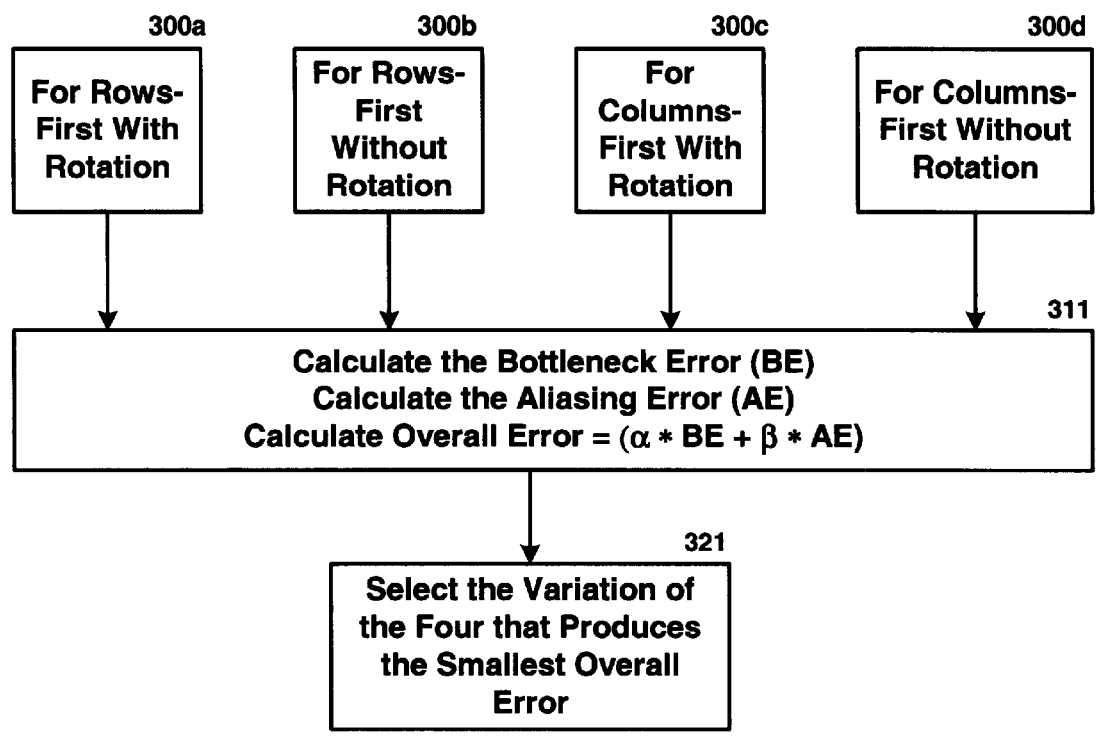

With pre-rotation this error is $$\max\left\{\left(\max\left\{\left|\frac{\partial y}{\partial u}\right| - 1, 0\right\}\right) \cdot \left|\frac{\partial x}{\partial u}\right|\right\}$$

for rows-first and $$\max\left\{\left(\max\left\{\left|\frac{\partial x}{\partial v}\right|-1,0\right\}\right)\cdot\left|\frac{\partial y}{\partial v}\right|\right\}$$

for columns-first. To minimize aliasing, the variation of this metric is chosen which produces the least aliasing error.

Where both bottleneck error and aliasing error are to be avoided, considering both the bottleneck error and the aliasing error provides the best overall result. A good algorithm for choosing the best variation thus considers both the bottleneck and the aliasing errors, but it is not clear how to decide when the two tests indicate conflicting choices. Thus, as shown in FIG. 4A, there are four variations 300a, 300b, 300c and 300d from which to choose. For each, a processing mechanism 310 produces an error term taking both the bottleneck error and aliasing error into account. A selection mechanism 320 selects a variation 300a, 300b, 300c, 300d based upon the error terms produced by the processing mechanism 310. A simple strategy may be to minimize a linear combination of the two errors, as illustrated in FIG. 3B by processing mechanism 311 and selection mechanism 321. It is somewhat akin to adding apples and oranges, but understanding the relative impacts of the two errors helps in choosing the coefficients. For example, a simple sum, i.e., linear combinations with coefficients 1, assigns to the bottleneck effect of a 45° rotation the same error as it does to a vertical stretch by a factor of 2 with slanting a vertical line to 45° by the first pass, which probably overrates the aliasing error. Ultimately, the coefficients can be determined empirically, based on the visual importance of the two effects. Moreover, if something is known about the signal being transformed in advance, such that assumptions can be made about the signal, this would alter the relative importance of the coefficients as well. Fortunately, the aliasing error is always bounded while the bottleneck error becomes infinite when the first pass has a singularity; in such a case, the bottleneck error will then outweigh the aliasing error, as it should, with any choice of positive coefficients.

Figure 4C:
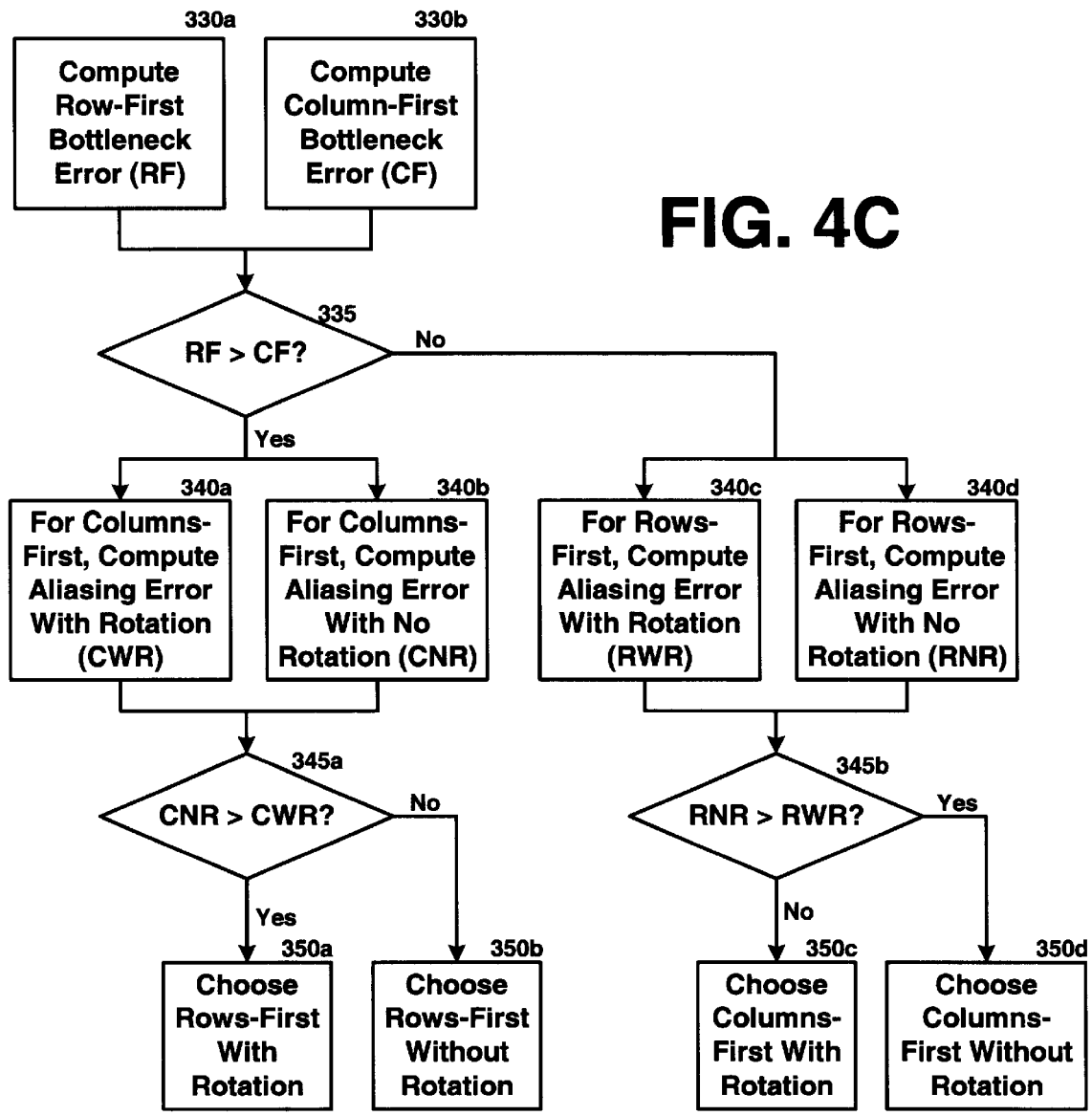

It should also be clear that the invention may be applied as any function of the bottleneck error plus any function of the aliasing error, and that many tradeoffs exist among computation, time, code size and resources. Thus, there are myriad ways to apply the invention beyond applying a linear combination of the bottleneck and aliasing errors described in accordance with the invention. For instance, FIG. 4C illustrates another exemplary implementation of the invention, which provides a different tradeoff, and emphasizes that there are a variety of techniques which can take both the bottleneck error and aliasing error into account. At 330a and 330b, the row-first bottleneck error (RF) and the column-first bottleneck error (CF) are computed, respectively. At 335, it is determined whether or not RF is greater than CF.

If RF is greater than CF, then at 340a and 340b, the aliasing error for a columns-first calculation with rotation (CWR) and the aliasing error for a columns-first calculation without rotation (CNR). If, as determined at 345a, CNR is greater than CWR, then the choice is one of rows-first with rotation at 350a. If CNR is not greater than CWR, then the choice is one of rows-first without rotation at 350b.

If RF is not greater than CF, then at 340c and 340d, the aliasing error for a rows-first calculation with rotation (RWR) and the aliasing error for a rows-first calculation without rotation (RNR). If, as determined at 345b, RNR is greater than RWR, then the choice is one of A columns-first with rotation at 350c. If RNR is not greater than RWR, then the choice is one of columns-first without rotation at 350d.

Computing the Errors for a Projective Transformation

For projective, a.k.a. perspective, transformations, the computation of the maxima of these errors over the unit square is simplified by the fact that they are attained at the corners of the image. This reduces the search for maxima to comparing a small number of values.

A projective (perspective) transformation can be written as:

$$x(u,v) = \frac{au+bv+d}{mu+nv+p}, y(u,v) = \frac{eu+fv+h}{mu+nv+p}.$$

The mapping is valid for the unit square only if $mu+nv+p \neq 0$ for all $0 \leq u,v \leq 1$.

With respect to computing the bottleneck error, elementary calculus yields $$\frac{\partial y/\partial u}{\partial x/\partial u} = \frac{(en-fm)v+ep-hm}{(an-bm)v+ap-dm}.$$

If the sign of the denominator at v=0 differs from the sign at v=1, (or if either value is zero,) then the ratio is unbounded; otherwise its maximum for $0 \leq v \leq 1$ is attained either at v=0 or at v=1 (see Appendix). The rows-first bottleneck error is therefore infinite if $(ap-dm)(an-bm+ap-dm) \leq 0$. Otherwise, the error is:

$$\max\left\{\left|\frac{en-fm}{ap-dm}\right|, \left|\frac{en-fm+ep-hm}{an-bm+ap-dm}\right|\right\}.$$

Similarly, the column-first bottleneck error is $$\frac{\partial x/\partial v}{\partial y/\partial v} = \frac{(bm-an)u+bp-dn}{(fm-en)u+fp-hn}.$$

It is unbounded if $(fp-hn)(fm-en+p-hn) \leq 0$. Otherwise the error is:

$$\max\left\{\left|\frac{bp-dn}{fp-hn}\right|, \left|\frac{bm-an+bp-dn}{fm-en+fp-hn}\right|\right\}.$$

With respect to computing the aliasing error, unlike the bottleneck error, the maximum of our proposed aliasing error for projective transformations is not proven to be attained of at the corners of the image. But if we approximate it with the product of maximal stretching and maximal slanting $$\left(\max\left\{\left|\frac{\partial y}{\partial v}\right|-1,0\right\}\right)\left(\max\left|\frac{\partial x}{\partial v}\right|\right)$$

then it does. It is based on maxima of partial derivatives, and these attain their maxima at the corners (see Appendix). This approximate aliasing error is obtained from 4 corner-values of simple expressions. For example, $$\frac{\partial x}{\partial u} = \frac{(an-bm)v+ap-dm}{(mu+nv+p)^2},$$

hence $$\max\left|\frac{\partial x}{\partial u}\right| =$$

$$\max\left\{\frac{ap-dm}{p^2}, \frac{ap-dm}{(m+p)^2}, \frac{an-bm+ap-dm}{(n+p)^2}, \frac{an-bm+ap-dm}{(m+n+p)^2}\right\}.$$

The other maxima are found in a similar fashion from $$\frac{\partial y}{\partial u} = \frac{(en-fm)v+ep-hm}{(mu+nv+p)^2},$$

$$\frac{\partial x}{\partial v} = \frac{(bm-an)u+bp-dn}{(mu+nv+p)^2}, \text{ and } \frac{\partial y}{\partial v} = \frac{(fm-en)u+fp-hn}{(mu+nv+p)^2}.$$

As mentioned above, while exemplary embodiments of the present invention have been described in connection with various computing devices and network architectures, the underlying concepts may be applied to any computing device or system in which it is desirable to two pass resample. Thus, the techniques for improved two pass resampling in accordance with the present invention may be applied to a variety of applications and devices. For instance, the improved selection of the four variations implemented in accordance with the invention may be applied to the operating system of a computing device, provided as a separate object on the device, as part of another object, as a downloadable object from a server, as a "middle man" A between a device or object and the network, as a distributed object, etc. The improved techniques the invention may also be included in connection with a processor of a host system, or a coprocessor, such as a graphics chip. A useful application for the invention includes performing mappings in connection with the streaming of data in a graphics pipeline. It is also noted that the invention may be used to perform three-dimensional (3-D) to two-dimensional (2-D) transformations in addition to 2-D to 2-D transformations. While exemplary programming languages, notations, names and examples are chosen herein as representative of various choices, these languages, notations, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the two pass resampling capabilities as described in exemplary embodiments above becomes an apparatus for TV practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred it embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Moreover, while the present invention has been described in various embodiments in connection with a processing mechanism and a selection mechanism for conceptual purposes, it is noted that practically, they may be included within the same object, hardware, code, etc. and/or provided separately. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

Appendix: Theory

Statement 1: A linear rational function $$f(t) = \frac{at+b}{ct+d}$$

is either constant or strictly monotonic.

Proof: If $$\frac{df}{dt} = \frac{ad-cb}{(ct+d)^2} = 0$$

then it is 0 everywhere, and then f is constant. Otherwise $$\frac{df}{dt}$$

is nowhere 0, and its sign never changes, hence the function is strictly monotonic.

Statement 2: Let $$x(u, v) = \frac{au + bv + d}{mu + nv + p}$$

where $mu+nv+p \neq 0$ for all $0 \leq u, v \leq 1$.

If the sign of $$\left| \frac{\partial x}{\partial u} \right|$$

at v=0 is different from its sign at v=1 then $$\frac{\partial y/\partial u}{\partial x/\partial u} = \frac{(en-mf)v + ep - mh}{(an-mb)v + ap - md}$$

is unbounded in the interval [0,1]. Otherwise the maximum of this ratio in the interval is attained at v=0 or at v=1.

Proof: By Statement 1, the ratio is either constant or strictly monotonic. If it is constant then the maximum is attained everywhere. Otherwise, it is strictly monotonic. If the function is continuous in the interval then its maximum is attained at 0 or 1.

The ratio fails to be continuous only where the denominator vanishes; but the denominator is $$\frac{\partial x}{\partial u} = \frac{(an-bm)v + ap - dm}{(mu+nv+p)^2},$$

and it vanishes only where (an−bm)v+ap−dm=0. If (an−bm)v+ap−dm=0 everywhere then the maximum is attained everywhere. Otherwise $(mu+nv+p)^2$ is positive, and then (an—bm)v+ap—dm must change sign where it vanishes, and that can happen only once. If that happens between 0 and 1, then the signs of $$\frac{\partial y/\partial u}{\partial x/\partial u}$$

must differ at 0 and 1.

Statement 3: The bounds of the partial derivatives of a projective transformation with a non-vanishing denominator over the unit square $\{0 \leq u, v \leq 1\}$ are attained at the corners (0,0), (1,0), (0,1), (1,1).

Proof: It suffices to prove the statement for $$f(u, v) = \frac{\partial x}{\partial v} = \frac{(bm-an)u + bp - dn}{(mu+nv+p)^2},$$

the proofs for the other partial derivatives are similar. The denominator doesn't vanish in the unit square, hence f is differentiable there, it has a maximum, and a maximum in the interior of the square would imply $$\frac{\partial f}{\partial v} = 0 \text{ and } \frac{\partial f}{\partial u} = 0$$

simultaneously. Write $$f(u, v) = \frac{qu + r}{(mu + nv + p)^2}$$

with q=bm−an and r=bp−dn. Then $$\frac{\partial f}{\partial v} = \frac{-2n(qu + r)}{(mu + nv + p)^3},$$

and it vanishes only if either n=0 or qu+r=0.

If n=0 then $$f(u, v) = \frac{bmu + bp}{(mu + p)^2} = \frac{b}{mu + p}.$$

In that case, $$\frac{\partial f}{\partial u} = \frac{-bm}{(mu + p)^2} = 0$$

implies either b=0, and then f(u, v)=0 everywhere, or m=0, and then $$f(u, v) = \frac{b}{p}$$

everywhere. In either case, f is constant, attaining its maximum everywhere.

If qu+r=0, then $$\frac{\partial f}{\partial u} = \frac{q(mu+nv+p)^2 - 2m(mu+nv+p)(qu+r)}{(mu+nv+p)^4} = \frac{q}{(mu+nv+p)^2},$$

and $$\frac{\partial f}{\partial u} = 0$$

implies q=0, hence $$f(u, v) = \frac{r}{(mu + nv + p)^2}.$$

If r=0 then f=0 everywhere, attaining its maximum everywhere. Otherwise f has a local maximum only where the denominator has a local minimum, and that happens only where it vanishes. But the denominator does not vanish in the unit square, hence a local maximum is impossible, and the maximum is attained along the boundary. Again, on a u=c edge (u=0 or u=1) the function $$g(v) = \frac{r}{(nv + (mc + p))^2}$$

has no a local maximum between 0 and 1, because its denominator is positive there; a similar argument rules out an interior maximum on any constant v edge. The maximum must therefore be attained at a corner.

What is claimed is:

1. A method for providing improved two pass resampling of data in a computing system, comprising:

for each of four possibilities associated with two pass resampling, the four possibilities being described by the permutation of (1) pre-rotating the data or not pre-rotating the data and (2) performing row-first processing or column-first processing, calculating a bottleneck error and an aliasing error associated with each of the four possibilities; and optimizing the choice of the four possibilities in accordance with both the bottleneck errors and the aliasing errors for the four possibilities.

2. A method according to claim 1, wherein said calculating includes computing an overall error value for each possibility based upon the bottleneck error and the aliasing error and said optimizing includes optimizing the choice based upon a comparison of the four overall values.

3. A method according to claim 2, wherein said computing includes computing a linear combination of the bottleneck error and the aliasing error.

4. A method according to claim 2, wherein said optimizing includes choosing the possibility having the smallest overall error.

5. A method according to claim 1, wherein said calculating includes first calculating the bottleneck error and first determining whether the rows-first bottleneck error is greater than columns-first bottleneck error, and if greater, then computing aliasing error with and without rotation for a columns-first configuration, and if lesser, then computing aliasing error with and without rotation for a rows-first configuration.

6. A method according to claim 5, further including second determining whether the aliasing error without rotation is greater than the aliasing error with rotation.

7. A method according to claim 6, wherein said possibility is optimized according to said optimizing based upon the result of said second determining.

8. A method according to claim 1, wherein the data is two-dimensional (2-D) data that is mapped to two-dimensional (2-D) data.

9. A method according to claim 1, wherein the data is three-dimensional (3-D) data that is mapped to two-dimensional (2-D) data.

10. A method according to claim 1, wherein said calculating of the aliasing error includes calculating the aliasing error based on partial derivatives of the data.

11. A method according to claim 1, wherein the transformation implemented by the two pass resampling is projective, and said calculating of the bottleneck error takes into account that the maxima of the bottleneck error take place at the corners of the data.

12. A method according to claim 1, wherein the transformation implemented by the two pass resampling is projective, and said calculating of the aliasing error includes approximating the aliasing error with the product of maximal stretching and maximal slanting of the data, and said calculating takes into account that the maxima of the approximated aliasing error take place at the corners of the data.

13. A computer readable medium having stored thereon a plurality of computer-executable instructions for performing the method of claim 1.

14. A modulated data signal carrying computer executable instructions for performing the method of claim 1.

15. A computing device comprising means for performing the method of claim 1.

16. A coprocessing device comprising means for performing the method of claim 1.

17. An application programming interface comprising a plurality of computer-executable modules for use in connection with a two pass resampling process in a computing system, the computer executable modules comprising:

a processing mechanism for calculating the bottleneck error and the aliasing error in connection with each of four possibilities associated with two pass resampling, the four possibilities being described by the permutation of (1) pre-rotating the data or not pre-rotating the data and (2) performing row-first processing or column-first processing; and a selection mechanism for optimizing the choice of the four possibilities in accordance with the calculated bottleneck and aliasing error.

18. An application programming interface according to claim 17, wherein said calculating by said processing mechanism includes computing an overall error value for each possibility based upon the bottleneck error and the aliasing error and said optimizing of said selection mechanism includes optimizing the choice based upon a comparison of the four overall values.

19. An application programming interface according to claim 18, wherein said computing by said processing mechanism includes computing a linear combination of the bottleneck error and the aliasing error.

20. An application programming interface according to claim 18, wherein said optimizing of said selection mechanism includes choosing the possibility having the smallest overall error.

21. An application programming interface according to claim 17, wherein said calculating of said processing mechanism includes first calculating the bottleneck error and first determining whether the rows-first bottleneck error is greater than columns-first bottleneck error, and if greater, then computing aliasing error with and without rotation for a columns-first configuration, and if lesser, then computing aliasing error with and without rotation for a rows-first configuration.

22. An application programming interface according to claim 21, further including second determining whether the aliasing error without rotation is greater than the aliasing error with rotation.

23. An application programming interface according to claim 22, wherein said possibility is optimized according to said optimizing by said selection mechanism based upon the result of said second determining.

24. An application programming interface according to claim 17, wherein the data is two-dimensional (2-D) data that is mapped to two-dimensional (2-D) data.

25. An application programming interface according to claim 17, wherein the data is three-dimensional (3-D) data that is mapped to two-dimensional (2-D) data.

26. An application programming interface according to claim 17, wherein said calculating of the aliasing error by said processing mechanism includes calculating the aliasing error based on partial derivatives of the data.

27. An application programming interface according to claim 17, wherein the transformation implemented by the two pass resampling is projective, and said calculating of the bottleneck error by said processing mechanism takes into account that the maxima of the bottleneck error take place at the corners of the data.

28. An application programming interface according to claim 17, wherein the transformation implemented by the two pass resampling is projective, and said calculating of the aliasing error by said processing mechanism includes approximating the aliasing error with the product of maximal stretching and maximal slanting of the data, and said calculating of the processing mechanism takes into account that the maxima of the approximated aliasing error take place at the corners of the data.

29. A modulated data signal carrying computer executable instructions at least one of included in and produced by the application programming interface of claim 17.

30. An operating system comprising the application programming interface of claim 17.

31. At least one computer readable medium having stored thereon a plurality of computer-executable modules for use in connection with a two pass resampling process in a computing system, the computer executable modules comprising:

a processing mechanism for calculating the bottleneck error and the aliasing error in connection with each of four possibilities associated with two pass resampling, the four possibilities being described by the permutation of (1) pre-rotating the data or not pre-rotating the data and (2) performing row-first processing or column-first processing; and a selection mechanism for optimizing the choice of the four possibilities in accordance with the calculated bottleneck and aliasing error.

32. At least one computer readable medium according to claim 31, wherein said calculating by said processing mechanism includes computing an overall error value for each possibility based upon the bottleneck error and the aliasing error and said optimizing of said selection mechanism includes optimizing the choice based upon a comparison of the four overall values.

33. At least one computer readable medium according to claim 32, wherein said computing by said processing mechanism includes computing a linear combination of the bottleneck error and the aliasing error.

34. At least one computer readable medium according to claim 32, wherein said optimizing of said selection mechanism includes choosing the possibility having the smallest overall error.

35. At least one computer readable medium according to claim 31, wherein said calculating of said processing mechanism includes first calculating the bottleneck error and first determining whether the rows-first bottleneck error is greater than columns-first bottleneck error, and if greater, then computing aliasing error with and without rotation for a columns-first configuration, and if lesser, then computing aliasing error with and without rotation for a rows-first configuration.

36. At least one computer readable medium according to claim 35, further including second determining whether the aliasing error without rotation is greater than the aliasing error with rotation.

37. At least one computer readable medium according to claim 36, wherein said possibility is optimized according to said optimizing by said selection mechanism based upon the result of said second determining.

38. At least one computer readable medium according to claim 31, wherein the data is two-dimensional (2-D) data that is mapped to two-dimensional (2-D) data.

39. At least one computer readable medium according to claim 31, wherein the data is three-dimensional (3-D) data that is mapped to two-dimensional (2-D) data.

40. At least one computer readable medium according to claim 31, wherein said calculating of the aliasing error by said processing mechanism includes calculating the aliasing error based on partial derivatives of the data.

41. At least one computer readable medium according to claim 31, wherein the transformation implemented by the two pass resampling is projective, and said calculating of the bottleneck error by said processing mechanism takes into account that the maxima of the bottleneck error take place at the corners of the data.

42. At least one computer readable medium according to claim 31, wherein the transformation implemented by the two pass resampling is projective, and said calculating of the aliasing error by said processing mechanism includes approximating the aliasing error with the product of maximal stretching and maximal slanting of the data, and said calculating of the processing mechanism takes into account that the maxima of the approximated aliasing error take place at the corners of the data.

43. A modulated data signal carrying computer executable instructions output as a result of the execution of the plurality of computer-executable instructions of the at least one computer readable medium of claim 31.

44. A computing device comprising means for carrying out the plurality of computer-executable instructions of the at least one computer readable medium of claim 31.

* * * * *